United States Patent [19]

Diepstraten

[11] Patent Number: 5,491,723
[45] Date of Patent: Feb. 13, 1996

[54] WIRELESS COMMUNICATION SYSTEM HAVING ANTENNA DIVERSITY

[75] Inventor: Wilhelmus J. M. Diepstraten, Diessen, Netherlands

[73] Assignee: NCR Corporation, Dayton, Ohio

[21] Appl. No.: 209,099

[22] Filed: Apr. 14, 1994

[30] Foreign Application Priority Data

May 6, 1993 [GB] United Kingdom .................. 9309353

[51] Int. Cl.$^6$ .................................. H04B 7/02; H04L 1/02
[52] U.S. Cl. .................... 375/267; 375/299; 375/347; 455/33.3; 455/52.3; 455/69; 455/82; 455/101; 343/876; 370/32; 370/38
[58] Field of Search ................... 455/52.1, 52.2, 455/52.3, 73, 78, 82, 89, 269, 277.1, 277.2, 13.3, 19, 83, 24, 33.3, 54.1, 54.2, 101, 69; 375/100, 267, 299, 347; 370/32, 38, 24; 343/876

[56] References Cited

U.S. PATENT DOCUMENTS

| | | |
|---|---|---|
| 4,513,412 | 4/1985 | Cox ........................................... 370/29 |
| 4,566,133 | 1/1986 | Rambo .................................... 455/277.2 |
| 4,710,944 | 2/1987 | Nossen .................................... 455/52.3 |
| 4,977,616 | 12/1990 | Linder et al. ........................... 455/277 |
| 5,065,449 | 11/1991 | Gordon et al. ....................... 455/277.2 |
| 5,131,006 | 7/1992 | Kamerman et al. ......................... 375/1 |

*Primary Examiner*—Stephen Chin
*Assistant Examiner*—Amanda T. Le
*Attorney, Agent, or Firm*—Paul J. Maginot

[57] ABSTRACT

A wireless communication system includes a plurality of stations each having a plurality of antennas. A first packet, containing a training signal portion is transmitted from a transmitting station using a first selected antenna and received at a receiving station using a second selected antenna which is selected as the antenna giving the best received signal quality, determined during the training signal period. Following transmission of the first packet, a control signal (ACKCNTL) is generated in both the transmitting station and the receiving station to condition these stations for the transmission from the receiving station of a response packet via the same antenna pair used for the information packet transmission. Thus, the response packet need have only a relatively short training signal portion.

7 Claims, 6 Drawing Sheets

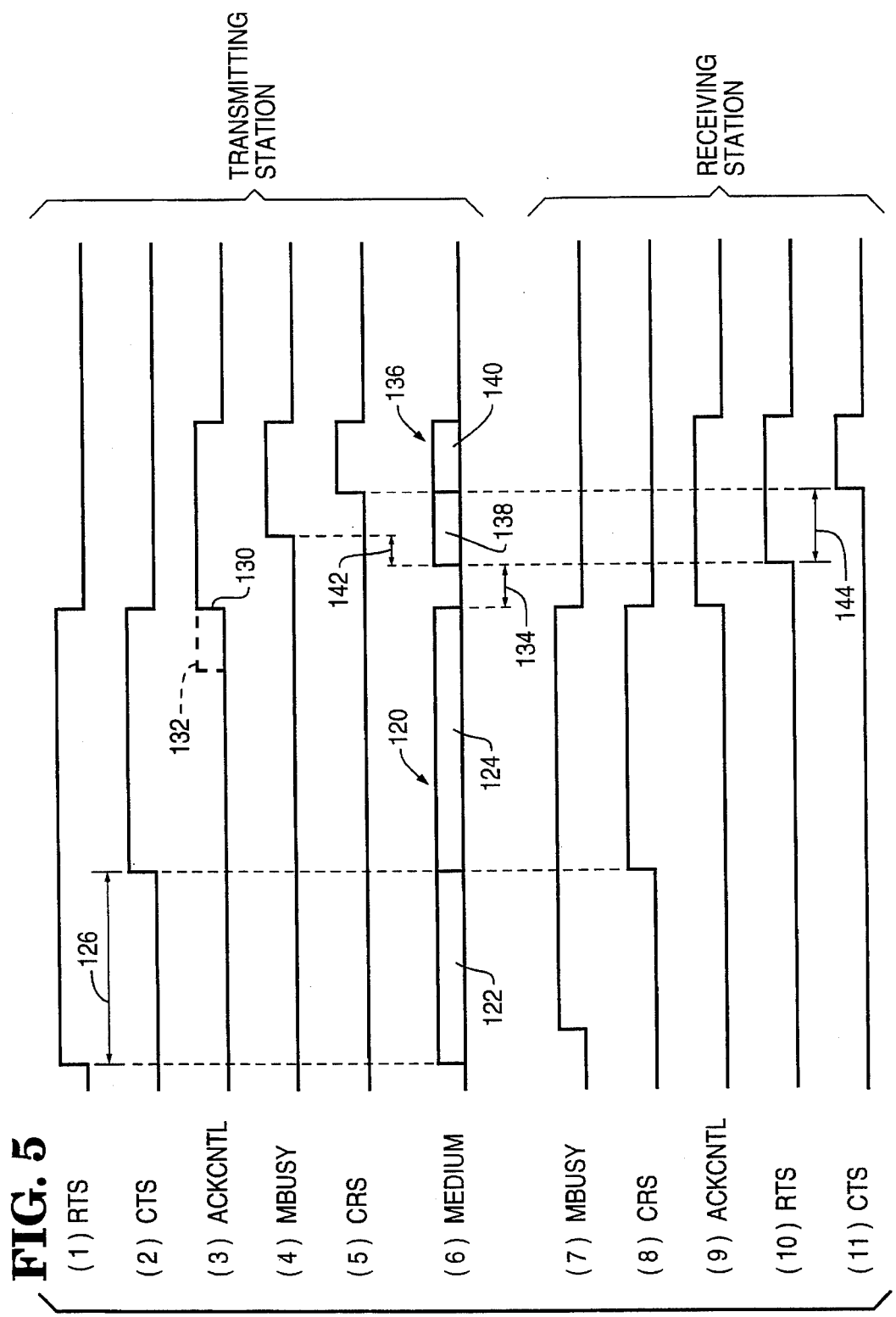

WIRELESS COMMUNICATION SYSTEM HAVING ANTENNA DIVERSITY

BACKGROUND OF THE INVENTION

This invention relates to a wireless communication system and to a method of operating such a system.

An important effect in wireless communication and especially indoor radio data communication is fading. This is the phenomenon which occurs when multiple copies of an omnidirected transmitted signal arrive at a receiver antenna via different paths, having different propagation delays. The signals will add together, but with different relative phases with respect to each other, which may result in an increased signal level, but may also result in a much lower level signal when multiple received signals cancel each other out, depending on the relative phases of the signals.

To deal with this phenomenon, wireless communication systems need to be designed with significant margins in the receiver dynamic range, such that the added attenuation as a result of a fade can be overcome. The probability of a signal level at a given distance between the transmitter and the receiver is given by a so-called Rayleigh attenuation model. Maintaining a given margin for this effect results in a so-called outage probability, which is the probability that a fade is so deep that the signal cannot be received. The outage probability can be significantly reduced if more than one antenna is used for reception of the signal, as long as the received signal levels on the antennas are independent or uncorrelated.

Different methodologies can be used to combine the signals received over the antennas. One of the methods which can be implemented with only a single radio receiver is the so-called selection diversity system, which selects the best antenna based on the measured signal quality. The resulting outage probability of such a system is the product of the individual probabilities, and is therefore considerably reduced.

Such a selection diversity system is described, for example, in U.S. Pat. No. 5,131,006, which discloses a wireless local area network including a plurality of stations adapted to communicate with one another over a common wireless communication channel. Each station has two antennas, which are polarized in different directions, such as at right angles to each other. Packets transmitted in the network include an initial training signal portion which extends over a plurality of antenna selection periods, referred to as antenna slot periods. During the receipt of a training signal at a station, the station alternates between its antennas for a plurality (e.g. four) of successive antenna slot periods, the received signal quality for the respective antennas is measured, and the station selects the antenna giving the better signal quality for receipt of the subsequent portion of the transmitted packet. This procedure has the disadvantage that a long training signal is needed for each transmitted packet to enable the antenna selection procedure to be effected.

SUMMARY OF THE INVENTION

It is an object of the present invention to provide a wireless communication system wherein the time overhead of the communication medium is reduced.

Therefore, according to one aspect of the present invention, there is provided a method of operating a wireless communication system including a plurality of stations each having a plurality of antennas, including the steps of: selecting a first antenna at a first station for transmitting a first packet to a second station; and selecting a second antenna at said second station for receiving the transmitted first packet, characterized by the steps of: transmitting a response packet from said second station utilizing said second antenna; and receiving said response packet at said first station utilizing said first antenna.

According to another aspect of the present invention, there is provided a wireless communication system including a plurality of stations each having a plurality of antennas and including antenna select switching means, wherein first antenna select switching means at said first station is controlled to select a first antenna for transmitting a first packet to a second station and second antenna select switching means at said second station is controlled to select a second antenna to receive the transmitted first packet at said second station, characterized in that, in response to receiving said first packet, said second switching means is controlled to enable the transmission of a response packet utilizing said second antenna and said first switching means is controlled to enable the receipt of response packet utilizing said first antenna.

It will be appreciated that in a wireless communication system according to the invention the loading of the time overhead of the communication medium is reduced, since the use of the same antenna pair to transmit the response packet as was used to transmit the first packet enables a shorter training signal to be utilized for the response packet. This advantage arises since, in a wireless transmission channel, the attenuation from a transmit antenna to the receive antenna is the same as from the receive antenna to a transmit antenna, since the wireless transmission channel has identical characteristics in both directions.

BRIEF DESCRIPTION OF THE DRAWINGS

One embodiment of the present invention will now be described by way of example, with reference to the accompanying drawings, in which:

FIG. 5 is a timing diagram illustrating packet transmission between two stations.

DETAILED DESCRIPTION OF THE PREFERRED EMBODIMENT

Figure 1:
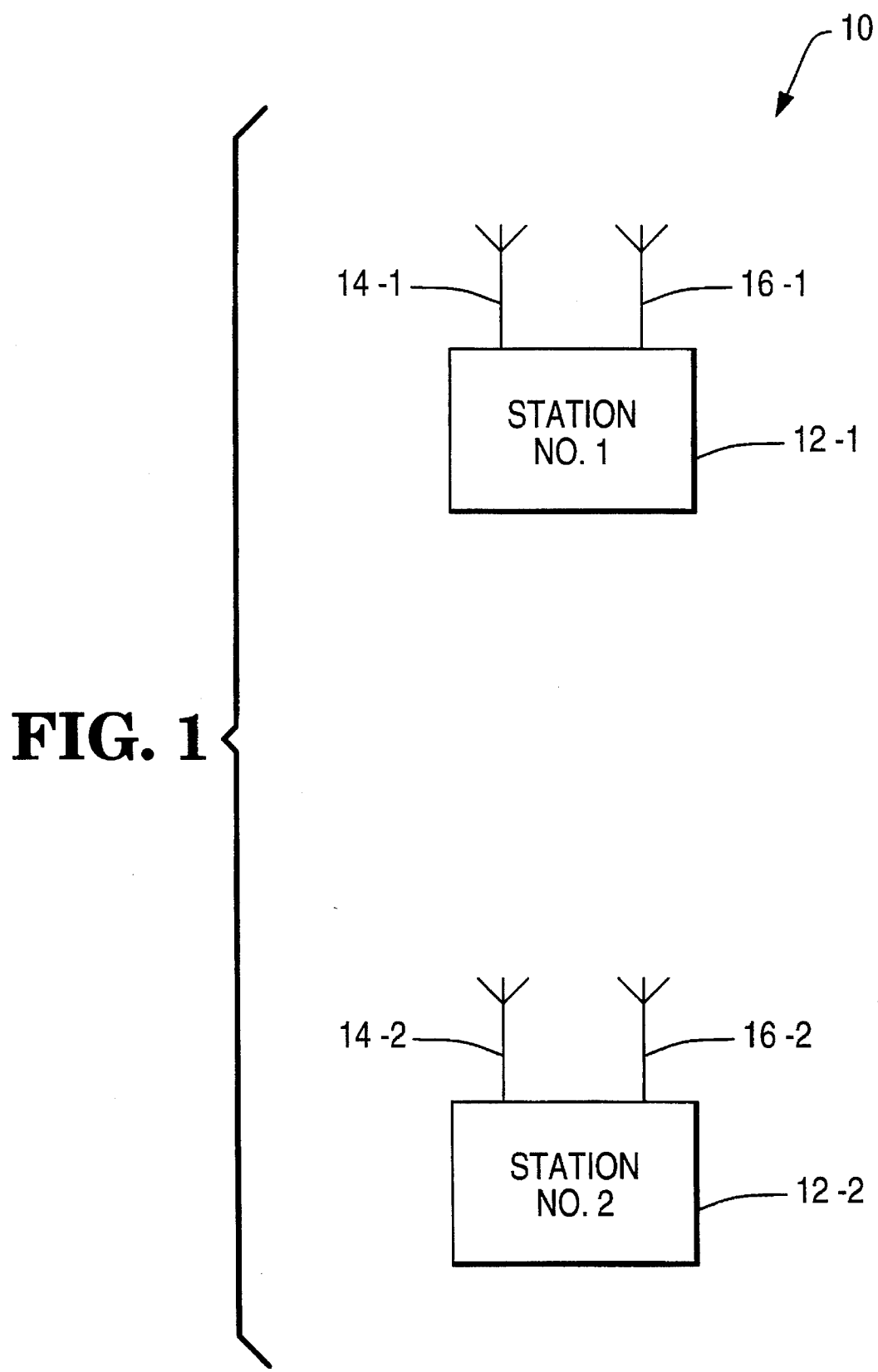
FIG. 1 is a diagram of a wireless communication system including a plurality of stations.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

Referring first to FIG. 1, there is shown a wireless communication system 10 including two stations 12, referenced individually as stations 12-1 and 12-2. The stations 12 each have two antennas 14 and 16, which are shown individually as antennas 14-1 and 16-1 for station 12-1 and as antennas 14-2 and 16-2 for station 12-2. The antennas 14, 16 may be polarized in different directions, such as at right angles to each other. By selecting the antenna 14 or 16 giving the better received signal quality the probability of outage, that is, a signal fade which is so deep that the signal cannot be effectively received, is considerably reduced. As mentioned hereinabove a procedure for effecting antenna selection is described, for example, in U.S. Pat. No. 5,131, 006.

It should be understood that in practice the two stations 12-1 and 12-2 may be augmented by a plurality of further stations 12 (not shown), such that the wireless communication system 10 operates as a local area network (LAN). The stations 12 may be fixed or may be mobile (portable) stations. In another arrangement one of the stations may serve as an access point to a backbone wired LAN (not shown).

Figure 2:
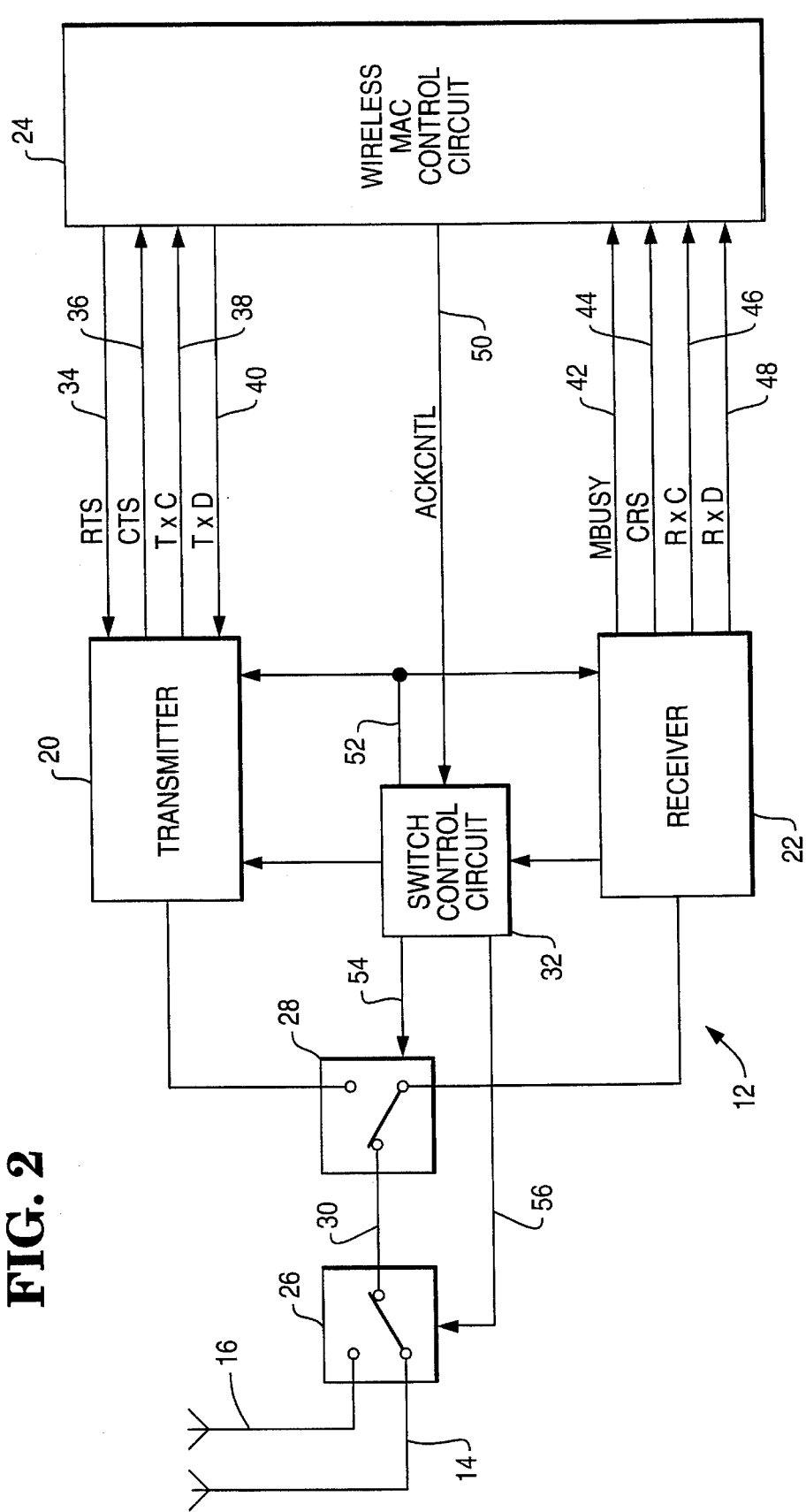
FIG. 2 is a block diagram of a typical one of the stations shown in FIG. 1.

Referring now to FIG. 2, there is shown a simplified block diagram of station 12, showing in particular the features which are important to the present invention. The station 12 includes a transmitter 20, a receiver 22 and a wireless MAC (medium access control) control circuit 24. The station 12 also includes an antenna select switch 26 for selecting one of the antennas 14, 16, and a transmit/receive mode switch 28 connected to the antenna select switch 26 via a line 30. The transmit/receive mode switch 28 is operated according to whether the station 12 is in transmit mode or receive mode. A switch control circuit 32 is provided to control the operation of the switches 26, 28.

Lines 34, 36, 38 and 40 connect between the transmitter 20 and the wireless MAC control circuit 24 and carry, respectively, signals RTS (request to send), CTS (clear to send), TxC (transmit clock) and TxD (transmit data). Lines 42, 44, 46 and 48 connect between the receiver 22 and the wireless MAC control circuit 24 and carry, respectively, signals MBUSY (medium busy), CRS (carrier sense), RxC (receiver clock) and RxD (receive data). The various signals on the lines 34–48 are standard signals used in local area network systems. An additional signal ACKCNTL is provided on a line 50 by the wireless MAC control circuit 24 to the switch control circuit 32 as a control signal for an acknowledgment operation, as will be explained hereinafter.

The switch control circuit 32 provides a short training control signal on a line 52 to the transmitter 20 and the receiver 22. The switch control circuit 32 also provides a transmit/receive mode control signal via a line 54 to the mode control switch 28, and an antenna selection control signal via a line 56 to the antenna select switch 26.

It is emphasized that FIG. 2 is a representation of a typical station 12, the components thereof having generalized reference numbers. Thus the station 12-1 includes transmitter 20-1, receiver 22-1, switch control circuit 32-1 etc., and station 12-2 includes transmitter 20-2, receiver 22-2, switch control circuit 32-2, etc.

Figure 3A:
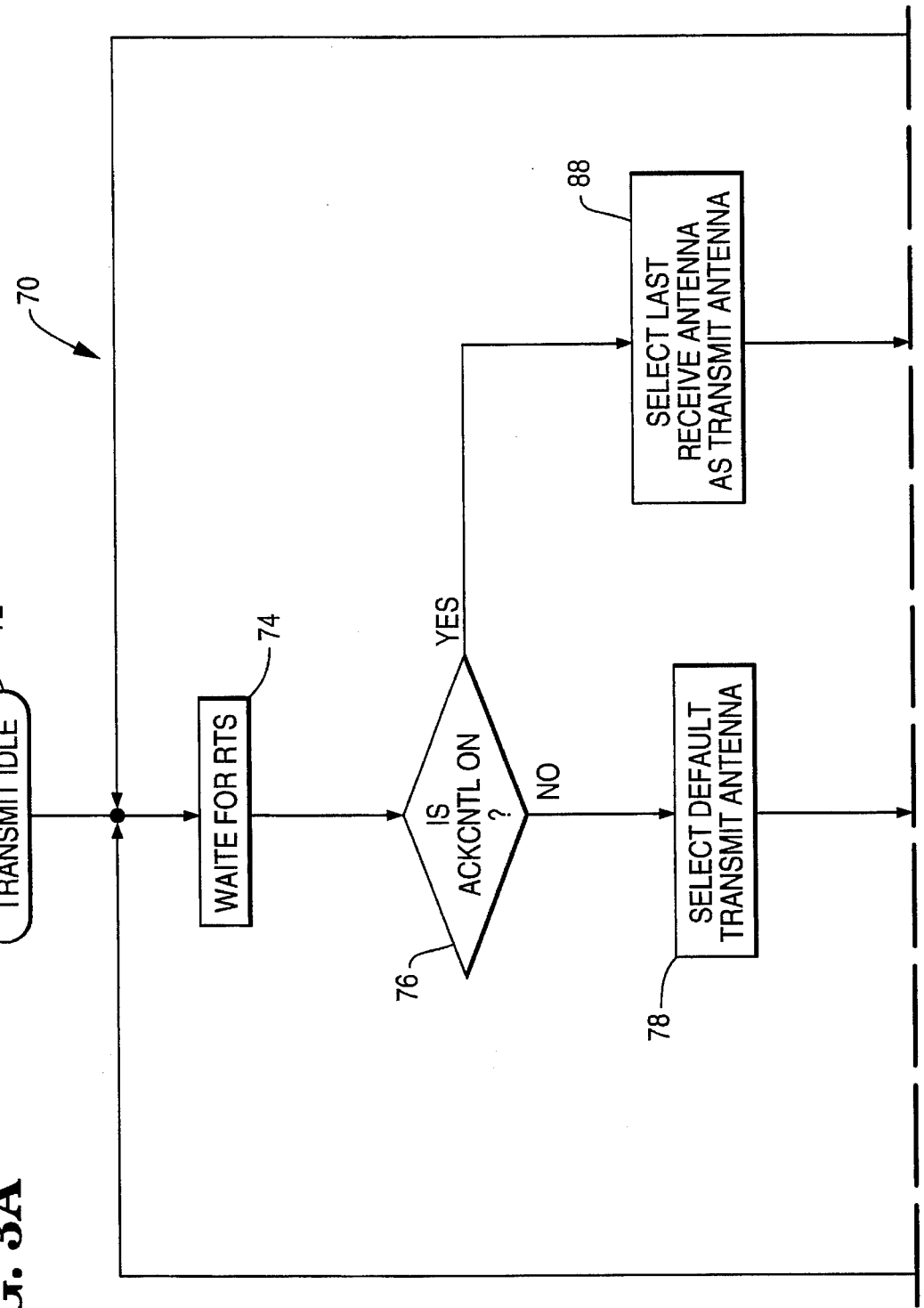
FIGS. 3A and 3B are a flowchart illustrating the operation of a transmitter included in the station shown in FIG. 2.
Figure 3B:
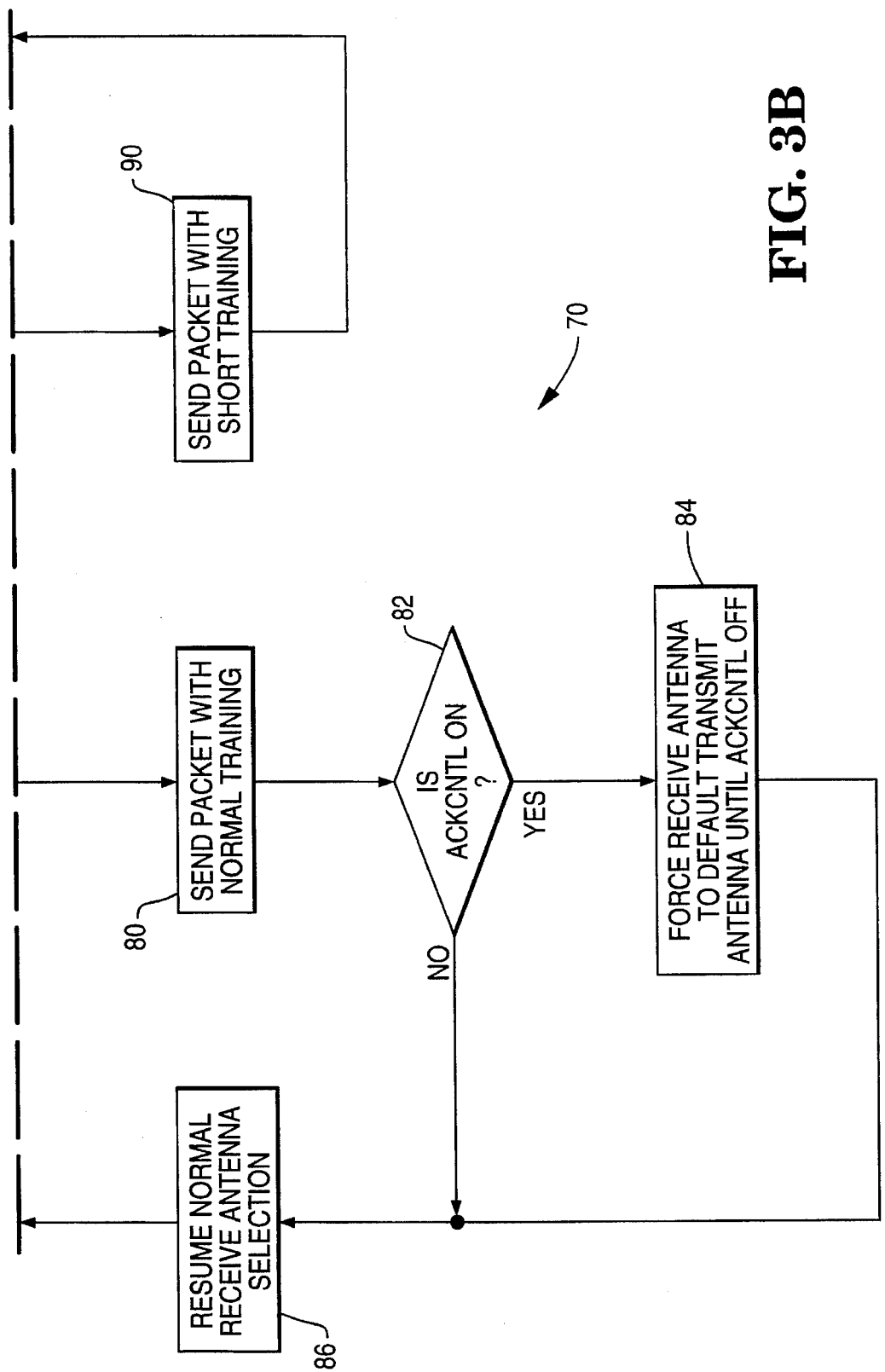
Figure 4:
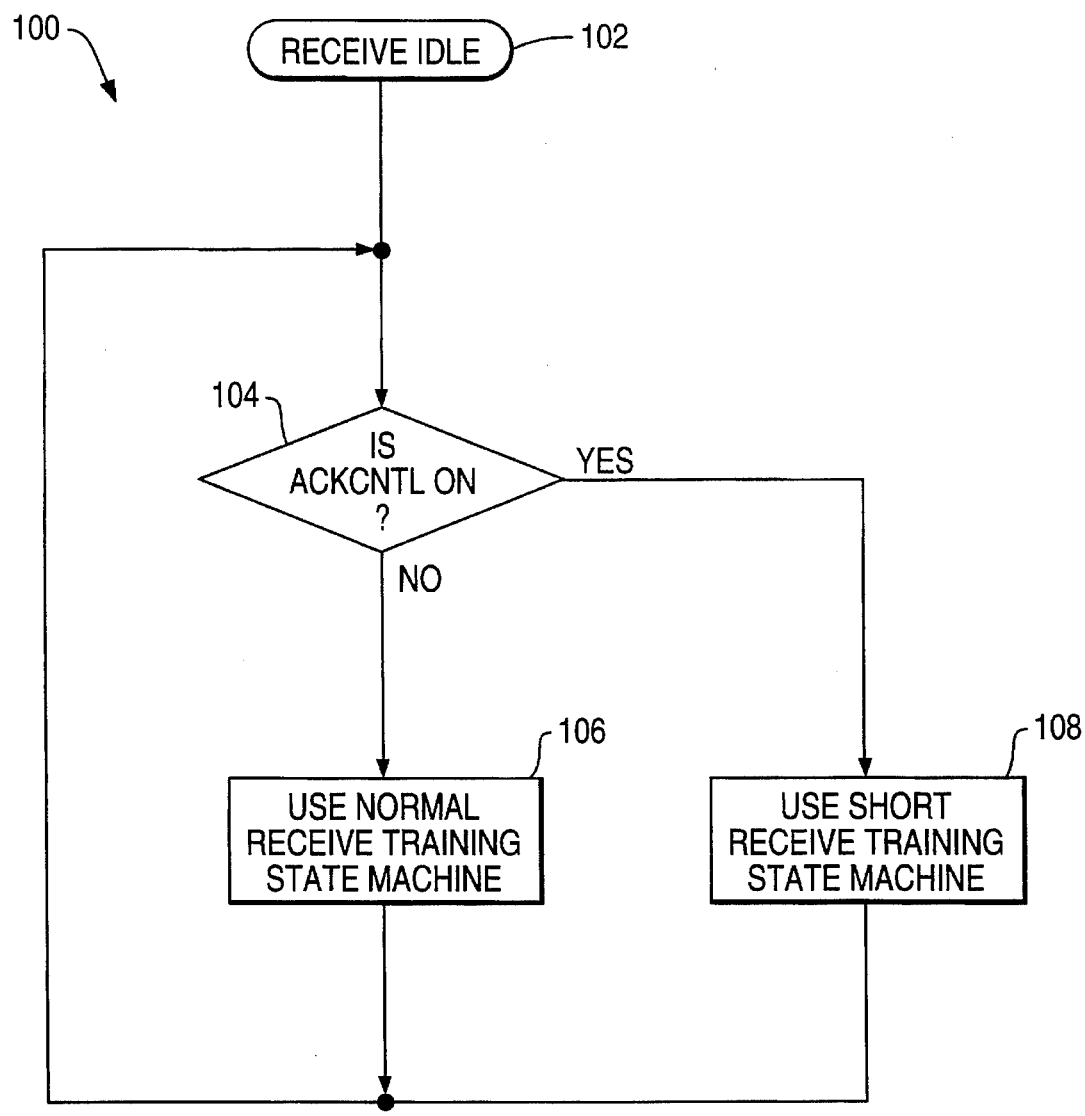
FIG. 4 is a flowchart illustrating the operation of a receiver included in the station shown in FIG. 2.

Referring now to the flowcharts 70 and 100 of FIGS. 3A, 3B and 4, the operation of the wireless communication system 10 (FIG. 1) will be described, with reference also to the timing diagram of FIG. 5. FIGS. 3A and 3B show a flowchart 70 which illustrates the operation of the transmitter 20 (FIG. 2) whereas the flowchart 100 of FIG. 4 illustrates the operation of the receiver 22 (FIG. 2).

Starting in the transmit idle state (block 72 FIG. 3A) the transmitter 20 waits for an RTS (request to send) signal (block 74). When an RTS signal (FIG. 5 line (1)) is generated on the line 34 (FIG. 2), indicating that the station 12 wishes to transmit a packet, an inquiry is made (block 76) as to whether the ACKCNTL signal is on. Assuming that the packet to be transmitted is an information packet, then the ACKCNTL signal is not on, and the flowchart 70 proceeds to block 78, which shows that a particular one of the two antennas 14, 16, referred to as the default transmit antenna, is selected as the antenna for transmitting the information packet. For example, in the system shown in FIG. 1, transmitting station 12-1 may select the antenna 14-1 as the default antenna for transmission. As shown in block 80, the information packet is transmitted with a normal length training signal. Referring briefly to FIG. 5, line (6) shows an information packet 120, consisting of a normal length training signal 122, followed by a standard format MAC information frame 124, the contents of which are not pertinent to the present invention, and therefore will not be described herein. The training time 126 is initiated in the transmitter 20 (FIG. 2) upon receipt of the RTS signal on the line 34, which initiates operation of a training signal timer (not shown), upon the time-out of which, a CTS (clear-to-send) signal is sent over the line 36 to the wireless MAC control circuit 24 which responds by sending the data signals TxD over the line 40, with a timing determined by the TxC clock signals on the line 38. Such TxD signals constitute the MAC information frame 124 of the packet 120 (FIG. 5, line (6)).

Assuming that an acknowledgment packet (ACK packet), that is, a packet which indicates correct reception of the information packet, is expected from the destination station 12 of the information packet 120, the wireless MAC control circuit 24 issues an ACKCNTL signal on line 50 (FIG. 2) as shown in FIG. 5, line (3). The ACKCNTL signal 130 commences, as shown by rising edge 130, when the transmitted information packet 120 terminates. However, an earlier rise time for the ACKCNTL signal is possible, as shown by dashed line 132. The ACKCNTL signal is applied to the switch control circuit 32. The switch control circuit 32 changes over the mode control switch 28 to the receive mode and, responsive to the active ACKCNTL signal, causes the antenna select switch 26 to maintain the selected antenna as the antenna 14 or 16 which was used to transmit the information packet, i.e. the default antenna. The operation is illustrated in blocks 82 and 84, FIG. 3B. The default transmit antenna is maintained as the default antenna until the ACKCNTL signal becomes deactive (block 84), whereafter normal receiver antenna selection, based on the best quality received signal, is resumed (block 86).

It should be understood that there may be some situations where an acknowledgment packet is not expected, for example, if the transmitted information packet is a broadcast packet, i.e. a packet in a network transmitted to all stations in the network, rather than to a single destination station. Thus, if the decision block 82 indicates that no ACKCNTL signal is generated, the flowchart 70 proceeds directly to block 86 and normal receive antenna selection is resumed.

Following a conventional interframe spacing (IFS) time interval 134, the receiving station transmits an acknowledgment packet 136 having a short training signal portion 138 and a remaining portion 140 which addresses the station which transmitted the information packet and may contain additional conventional packet portions which are not relevant to the present invention and therefore will not be described.

It should be understood that the transmitting and receiving stations are already in antenna slot synchronization, that is, the antenna slot timing periods of the two stations are synchronized. It will be appreciated that the time interval 142 between the commencement of the ACK packet 136 on the transmission medium and the rise of the MBUSY signal, FIG. 5, line (4), at the station which receives the ACK packet, corresponds to an antenna slot time period, and that no training time is wasted as a result of lack of antenna slot synchronization since the receiving station transmits the acknowledgment packet with a timing such that the antenna slot timing of the station which transmitted the original information packet is optimally synchronized to receive the acknowledgment packet.

The operation at the receiving station of a transmitted information packet will now be described. Referring to FIG. 5, lines (7) to (11), it is seen that following the deactivation of the MBUSY and CRS signals, the ACKCNTL signal at the receiving station is activated on the line 50 thereby causing the switch control circuit 32 to issue a signal on the line 52 identifying that a short training signal is to be transmitted and via the line 56 maintaining the antenna select switch 26 such that the same antenna 14 or 16 used for transmitting the ACK packet 136 (FIG. 5) as was used for receiving the information packet 120 (FIG. 5). Thus the transmitter 20 of the receiving station is conditioned, after the expiry of the interframe spacing period 134 on the rise of the RTS signal (FIG. 5, line (10)), to transmit an ACK packet 136 having a short training signal portion 138, using the same antenna as received the information packet. The activation of the CTS signal (FIG. 5, line (11), defines the termination of the short training signal time period 144, FIG. 5. Thereafter the remaining portion 140 of the ACK packet 136 is transmitted on the TxD line 40, using the transmit clock signals TxC on the line 38, and without any defer such is the case for information packet transmissions according to the utilized CSMA/CA protocol when the medium is sensed as busy.

Referring briefly to FIGS. 3A and 3B, the above-discussed procedure is illustrated by noting that at decision box 76, if the ACKCNTL signal is determined as on, as is the case for the receiving station of an information packet, then the last receive antenna is selected as the transmit antenna (block 88) and the ACK packet is sent with a short training signal portion (block 90).

Referring now to FIG. 4, the above-described operation of the receiver 22 is illustrated by flowchart 100. Starting from the idle state 102, the flowchart 1 00 proceeds to decision block 104 where a determination is made as to whether the ACKCNTL signal is on. If the ACKCNTL signal is not on, then the receiver 22 is conditioned to use a normal receive training state machine, wherein as discussed hereinabove, the antenna 14 or 16 providing the better signal quality is selected after a plurality of antenna slot periods. If the ACKCNTL is on, then the receiver 22 is conditioned to use a short receive training state machine, wherein the short training signal is used merely for the adjustment of receiver parameters, for example to adapt an automatic gain control circuit, to effect phase training, etc., since antenna selection is not required. These adjustments can be effected within the duration of a single antenna slot period, rather than the four (for example) antenna slot periods needed to establish antenna selection.

In accordance with the above-described embodiment of the invention, an information packet is transmitted from a first station 12 to a second station 12 and the correct reception of the information packet is indicated by transmitting an acknowledgment (ACK) packet back from the second station to the first station. However, the invention is not restricted to the transmission of information and ACK packets, but is generally applicable to a wireless communication system having antenna diversity wherein the transmission of a packet from a first station 12 to a second station 12 requires a response packet from the second station to the first station, the same antenna system being used for the response packet as was used for the originally transmitted packet. Moreover, the same antenna system can be maintained for the duration of a burst of bidirectional packet transmission. For example the first station 12 may transmit a poll packet which requires the response packet to be an information packet. The poll packet includes a relatively long training signal portion, utilized to select an antenna at the second station. However, the information packet transmitted back in response from the second station to the first station maintains the same selected antenna system, and thus needs only a relatively short training signal portion. Furthermore, if an ACK packet is now transmitted back from the first station to the second station, to acknowledge correct receipt of the information packet, the same antenna system can again be maintained.

Another example is where there is a multiple packet exchange of messages. Thus a first station may send a request to send (RTS) packet to a second station which may respond with a clear to send (CTS) packet to the first station. The first station may then transmit an information packet to the second station, which responds with an ACK packet to indicate correct reception of the information packet. Then, if the selected antenna system resulting from the transmission of the initial RTS packet is maintained throughout the burst exchange of packets, only the initial RTS packet need have a relatively long training signal portion.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A wireless communication system, comprising:
   a first station having a first plurality of antennas, said first station further having a first antenna select switching means which is controlled to select a default antenna of the first plurality of antennas for transmitting an information packet; and
   a second station having a second plurality of antennas, said second station further having a second antenna select switching means which is controlled to select a second antenna of the second plurality of antennas to receive the transmitted information packet at said second station,
   wherein said second switching means is controlled to enable transmission of a response packet utilizing said second antenna after receipt of the transmitted information packet in response to the second antenna being selected to receive the transmitted information packet, and
   wherein said first switching means is controlled to enable receipt of the transmitted response packet utilizing said default antenna in response to the default antenna being selected to transmit the information packet.

2. A wireless communication system according to claim 1, wherein said information packet includes a training signal portion having a first duration, and said response packet includes a training signal portion having a second duration which is less than the first duration.

3. A wireless communication system according to claim 1, wherein said first station includes a first switch control means adapted to control the operation of the first antenna select switching means, and wherein said second station includes a second switch control means adapted to control the operation of the second antenna select switching means, and further wherein a control signal is adapted to be generated in each of said first and second stations for application to the respective first or second switch control means thereof, for conditioning the respective first or second station for receipt or transmission respectively of said response packet.

4. A wireless communication system according to claim 3, wherein said control signal is generated in response to completion of transmission of said information packet.

5. A wireless communication system according to claim 1, wherein said response packet is an acknowledgment packet.

6. A method of operating a wireless communication system having a plurality of stations with each station having a plurality of antennas, comprising the steps of:

identifying a default antenna within a first plurality of antennas at a first station;

selecting the default antenna for transmitting a first packet from the first station;

selecting a second antenna of a second plurality of antennas at a second station for receiving the first packet at the second station, wherein the second antenna selecting step comprises the step of testing received signal quality of the first packet on each of the second plurality of antennas at the second station in order to determine on which antenna to receive the first packet;

transmitting the first packet from the default antenna at the first station and receiving the first packet with the second antenna at the second station;

in response to the second antenna being selected in the second antenna selecting step, selecting to transmit an acknowledgment packet from only the second antenna of the second plurality of antennas at the second station after the first packet transmitting and receiving step, and in response to the default antenna being selected in the default antenna selecting step, selecting to receive the acknowledgment packet with only the default antenna of the first plurality of antennas at the first station.

7. The method of claim 6, wherein the first packet has a training signal portion having a first duration, and said response packet has a training signal portion having a second duration which is less than the first duration.

* * * * *